US006770341B1

(12) United States Patent
Böhm et al.

(10) Patent No.: US 6,770,341 B1
(45) Date of Patent: Aug. 3, 2004

(54) POLYETHYLENE MOLDING MATERIAL AND PIPE PRODUCED THEREWITH WITH IMPROVED MECHANICAL PROPERTIES

(75) Inventors: Ludwig Böhm, Hattersheim (DE); Joachim Berthold, Kelkheim (DE); Johannes-Friedrich Enderle, Frankfurt (DE); Elke Damm, Frankfurt (DE); Ulrich Schulte, Kelkheim (DE)

(73) Assignee: Basell Polyolefine GmbH (DE)

( * ) Notice: Subject to any disclaimer, the term of this patent is extended or adjusted under 35 U.S.C. 154(b) by 16 days.

(21) Appl. No.: 10/018,764

(22) PCT Filed: Jun. 20, 2000

(86) PCT No.: PCT/EP00/05651

§ 371 (c)(1),
(2), (4) Date: Dec. 17, 2001

(87) PCT Pub. No.: WO01/02480

PCT Pub. Date: Jan. 11, 2001

(30) Foreign Application Priority Data

Jun. 30, 1999 (DE) .......................... 199 29 812

(51) Int. Cl.$^7$ ............................... C08L 23/04
(52) U.S. Cl. .................... 428/35.7; 138/137; 428/36.92
(58) Field of Search ............... 428/35.7, 36.92, 428/36.9; 138/137, DIG. 7; 525/88, 240; 526/352

(56) References Cited

U.S. PATENT DOCUMENTS

| 5,338,589 | A | 8/1994 | Böhm et al. ............... 428/36.9 |
| 5,908,679 | A | * | 6/1999 | Berthold et al. ........... 428/36.9 |

FOREIGN PATENT DOCUMENTS

| EP | 0100843 | 2/1984 |
| EP | 0436520 | 7/1991 |
| EP | 0603935 | 6/1994 |
| EP | 0707040 | 4/1996 |
| EP | 0739937 | 10/1996 |
| EP | 0848036 | 6/1998 |
| WO | 91/18934 | 12/1991 |
| WO | 97/03124 | 1/1997 |
| WO | 00/01765 | 1/2000 |

OTHER PUBLICATIONS

Fleissner, M., *Kunststoffe* 77:45–50, "Slow Crack Growth and Creep Rupture Strength of Polyethylene Pipe," Frankfurt/Main, (1987) with translation.

"Crystallizability Distributions In Polymers: A New Analytical Technique" L. Wild and T. Ryle, *Polym. Prep. A, Chem. Soc.*—Polym. Chem. Div. 18, 182 (1977).

* cited by examiner

*Primary Examiner*—Sandra M. Nolan
(74) *Attorney, Agent, or Firm*—Connolly Bove Lodge & Hutz LLP

(57) ABSTRACT

A polyethylene molding material has a bimodal molecular weight distribution with an overall density of $\geq 0.948$ g/cm$^3$ and a melt flow index MFI$_{190/5}$ of $\leq 0.2$ dg/min. The molding material comprises from 35 to 65% by weight of low-molecular-weight ethylene hompolymer A having a viscosity number VN$_A$ in the range from 40 to 90 cm$^3$/g, a melt flow index MFI$_{190/2.16\,A}$ in the range from 40 to 2000 dg/min and a density d$_A$ of $\geq 0.965$ g/cm$^3$. Also included is from 35 to 65% by weight of high-molecular-weight ethylene copolymer B having a viscosity number VN$_B$ in the range from 500 to 2000 cm$^3$/g, a melt flow index MFI$_{190/5\,B}$ in the range from 0.02 to 0.2 dg/min and a density d$_B$ in the range from 0.922 to 0.944 g/cm$^3$.

8 Claims, 1 Drawing Sheet

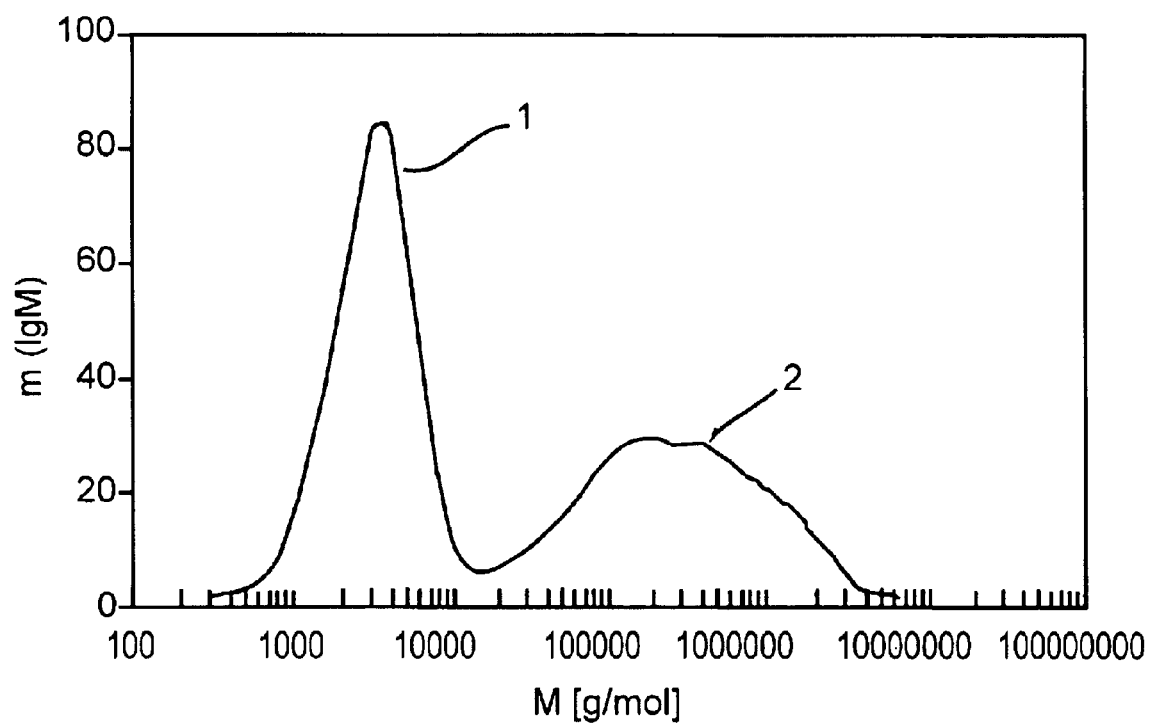

POLYETHYLENE MOLDING MATERIAL AND PIPE PRODUCED THEREWITH WITH IMPROVED MECHANICAL PROPERTIES

The present invention relates to a polyethylene molding material having a bimodal molecular weight distribution, and to a high-strength pipe produced from this molding material.

Polyethylene is widely used for the production of pipes, for example for gas- and water-transport systems, since a material having particularly high mechanical strength, high corrosion resistance and absolutely reliable long-term stability is required for such pipes. Numerous publications describe materials having an extremely wide variety of properties and processes for their production.

EP-A-603 935 has already described a molding material based on polyethylene which has a bimodal molecular weight distribution and is also said to be suitable, inter alia, for the production of pipes. However, pipes produced from the molding materials in accordance with this reference are unsatisfactory with respect to their long-term resistance to internal pressure, their stress cracking resistance, their low-temperature notched impact strength and their resistance to rapid crack growth.

In order to achieve pipes having balanced mechanical properties and thus an optimum property combination, it is necessary to employ a raw material which has an even broader molecular weight distribution. A raw material of this type is described in U.S. Pat. No. 5,338,589 and is produced using a highly active catalyst which is disclosed in WO 91/18934 and in which the magnesium alkoxide is employed as a gel-form suspension. Surprisingly, it has been found that the use of this material in moldings, in particular in pipes, enables a simultaneous improvement on the one hand in the properties of rigidity and creep tendency, which are usually contradictory in partially crystalline thermo-plastics, and on the other hand stress cracking resistance and toughness.

EP-A-0 739 937 has already disclosed a pipe which has mechanical properties which meet the very highest demands made by consumer associations and have resulted in classification of this pipe in quality class "PE 100" in accordance with ISO/DIS 9080.

The object of the present invention was the development of a polyethylene molding material with which even better strength of the pipes produced therewith can be achieved compared with the known pipe material in strength class PE 100 in accordance with ISO/DIS 9080.

This object is achieved by a molding material according to claim 1. The invention furthermore also relates to a pipe produced from this molding material having really excellent mechanical properties, and to its use for the construction of gas and water lines.

The polyethylene molding material according to the invention has a density at a temperature of 23° C. in the range $\geq 0.948$ as a natural product, i.e. without addition of dye, and $\geq 0.959$ g/cm$^3$ as a black-colored product having a carbon black content in the range from 2 to 5% by weight, based on the total weight of the black-colored product, and has a broad bimodal molecular weight distribution, in which the ratio of the weight of the low-molecular-weight fraction to the weight of the relatively high-molecular-weight fraction is in the range from 0.5 to 2.0, preferably from 0.8 to 1.8. The polyethylene may comprise small proportions of up to 5% by weight of further monomer units having from 4 to 10 carbon atoms. Examples of such comonomers are 1-butene, 1-pentene, 1-hexene or 4-methyl-1-pentene.

The bimodality can be described as a measure of the position of the centers of the two individual molecular weight distributions with the aid of the viscosity numbers (VN) in accordance with ISO/R 1191 of the polymers formed in two successive polymerization steps. The $VN_1$ of the low-molecular-weight polyethylene formed in the first polymerization step is from 40 to 90 cm$^3$/g, while $VN_{total}$ of the end product is in the range from 300 to 450 cm$^3$/g. $VN_2$ of the relatively high-molecular-weight polyethylene formed in the second polymerization step can be calculated from the following mathematical formula:

$$VN_2 = \frac{VN_{total} - w_1 \cdot VN_1}{1 - w_1}$$

where $w_1$ stands for the proportion by weight of the low-molecular-weight polyethylene formed in the first step, measured in % by weight, based on the total weight of the polyethylene having a bimodal molecular weight distribution formed in the two steps. The value calculated for $VN_2$ is normally in the range from 500 to 2000 cm$^3$/g.

The molding material according to the invention has long-term properties which even go beyond the requirement for quality class PE 100 in accordance with ISO/DIS 9080 of 10.0 MPa after 50 a as LCL (lower critical confidence limit), determined by the extrapolation method. Surprisingly, the polyethylene molding material according to the invention achieves an extremely high resistance to slow crack growth with the requisite relatively high rigidity and at relatively high yield stress. This high stress cracking resistance is evident from the fact that brittle fracture was not observed in the LTHS (long term hydrostatic strength) test within a time interval of 33,000 h at a temperature of 80° C. on pipes produced from the molding material according to the invention.

In the LTHS test, the service life of the pipes without brittle fracture is determined by extrapolation to 50 years. Owing to the extremely high stress cracking resistance achieved by the molding material according to the invention, the ductile line in the creep diagram, with the aid of which the service life is extrapolated to 50 years, is very flat. Consequently, an internal pressure of 12.5 MPa arises in accordance with this test method for pipes produced from the molding material according to the invention at a test temperature of 23° C. and a service life of 50 years, which accordingly results in a new quality class, PE 125.

The extrapolation curve at 23° C. can be described mathematically by the following equation:

$$\sigma = K \cdot t_{failure}^{-\eta}$$

For the standard values K=15.6 and $\eta$=−0.017, the following values arise through extrapolation for pipes produced from the molding material according to the invention:

| | $t_{failure}$ | | |
|---|---|---|---|
| | 10 h | 10,000 h | 50 years |
| $\sigma$ | 15.0 | 13.3 | 12.5 |

The polyethylene is obtained by polymerization of the monomers in suspension, in solution or in the gas phase at temperatures in the range from 20 to 120° C., a pressure in the range from 2 to 60 bar and in the presence of a Ziegler catalyst composed of a transition-metal compound and an organoaluminium compound. The polymerization is carried out in two successive steps, the molecular weight of the polyethylene being regulated in each step with the aid of hydrogen.

The polyethylene molding material according to the invention may, besides the polyethylene, also comprise further additives. Such additives are, for example, heat stabilizers, antioxidants, UV absorbers, light stabilizers, metal deactivators, peroxide-destroying compounds, basic costabilizers in amounts of from 0 to 10% by weight, preferably from 0 to 5% by weight, but also fillers, reinforcing agents, plasticizers, lubricants, emulsifiers, pigments, optical brighteners, flame retardants, antistatics, blowing agents or combinations of these in total amounts of from 0 to 50% by weight.

The pipe according to the invention is produced by firstly plasticating the polyethylene molding material in an extruder at temperatures in the range from 200 to 250° C. and then extruding the molding material through an annular die and cooling it. Pipes of the type according to the invention are generally suitable for all pressure classes in accordance with DIN 8074.

For conversion into pipes, it is possible to employ both conventional single-screw extruders having a smooth feed zone and also high-performance extruders having a finely grooved barrel and forced-conveying feed. The screws are typically designed as decompression screws with a length of from 25 to 30 D (D=Ø). The decompression screws have a metering zone in which temperature differences in the melt are compensated and in which the aim is for the relaxation stresses produced by shearing to be relaxed.

The melt coming from the extruder is firstly distributed over an annular cross section via conically arranged holes and then fed to the mandrel/die ring combination via a spiral mandrel melt distributor or a screen pack. In addition, restrictor rings or other design elements for smoothing out the melt flow may, if necessary, be installed before the die exit.

The calibration and cooling are advantageously carried out by vacuum calibration up to large pipe diameters. The actual shaping is carried out using slotted calibration sleeves, which, for better heat dissipation, are made of non-ferrous metal. A water film supplied in the inlet ensures rapid cooling of the surface of the pipe below the crystalline melting point and additionally serves as lubricating film for reducing frictional forces. The total length L of the cooling zone is set under the assumption that a melt having a temperature of 220° C. is to be cooled with the aid of water having a temperature of from 15 to 20° C. to the extent that the temperature of the pipe inside surface is at most 85° C.

The stress cracking resistance is a feature which is already known from EP-A 436 520. The process of slow crack growth can be significantly influenced by molecular structural parameters, such as molecular weight distribution and comonomer distribution. The number of so-called tie molecules is firstly determined by the chain length of the polymer. The morphology of partially crystalline polymers is in addition established by the incorporation of comonomers, since the thickness of crystalline lamellae can be influenced by the introduction of short-chain branches. This means that the number of tie molecules in copolymers is greater than in homopolymers having a comparable chain length.

The stress cracking resistance of the pipe according to the invention is determined by an internal measurement method. This laboratory method has been described by M. Fleißfner in Kunststoffe 77 (1987), p. 45 et seq. This publication shows that there is a correlation between the determination of slow crack growth in the creep test on test bars notched all round and the brittle branch of the long term hydrostatic strength test in accordance with ISO 1167. A shortening of the time to failure is achieved by shortening the crack initiation time by the notches (1.6 mm/razor blade) in ethylene glycol as stress cracking-promoting medium at a temperature of 80° C. and a tensile stress of 5 MPa. The samples are produced by cutting three test specimens having the dimensions 10×10×90 mm out of a pressed sheet with a thickness of 10 mm. The test specimens are notched all round in the center using a razor blade in a notching device made specifically for the purpose (see FIG. 5 in the above-mentioned publication). The notch depth is 1.6 mm.

The fracture toughness of the pipe according to the invention is likewise determined by an internal measurement method on test bars having the dimensions 10×10×80 mm which have been cut out of a pressed sheet with a thickness of 10 mm. Six of these test bars are notched in the center using a razor blade in the notching device already mentioned. The notch depth is 1.6 mm. The measurement is carried out largely corresponding to the Charpy measurement method in accordance with ISO 179 with different test specimens and a different impact geometry (distance between the supports). All test specimens are conditioned to the measurement temperature of 0° C. over a period of from 2 to 3 hours. A test specimen is then quickly placed onto the support of a pendulum impact tester in accordance with ISO 179. The distance between the supports is 60 mm. The drop of the 2 J hammer is initiated, the drop angle being set to 160°, the pendulum length to 225 mm and the impact velocity to 2.93 m/sec. For evaluation of the measurements, the quotient of consumed impact energy and initial cross-sectional area at the notch am in mJ/mm$^2$ is calculated. Only values for complete fracture and hinge fracture may serve as the basis for a joint mean (see ISO 179).

The notched impact strength$_{ISO}$ is measured in accordance with ISO 179. The dimension of the sample is 10×4×80 mm, with a V-notch having an angle of 45°, a depth of 2 mm and a notch base radius of 0.25 mm being grooved in.

The flexural creep modulus is measured as the one-minute value in accordance with DIN 54852-Z4.

The S4 test (small scale steady state test) serves to determine the resistance of the pipe to rapid crack propagation and is carried out on pipes with the dimension PN 10 having a diameter of 110 mm. The precise method is described in ISO/DIS 13477. This method determines the critical pressure $p_c$ in bar above which the pipe under this pressure $p_c$ cracks longitudinally over the entire length.

The following working examples are intended to depict the invention still more clearly for the person skilled in the art.

EXAMPLE 1 (According to the Invention)

A polyethylene molding material was produced using a Ziegler catalyst and in accordance with the procedure of WO 91/18934 maintaining the operating conditions indicated below in Table 1:

TABLE 1

|  | Reactor I<br>Capacity: 120 l | Reactor II<br>Capacity: 120 l |
| --- | --- | --- |
| Temperature | 83° C. | 83° C. |
| Catalyst feed | 0.8 mmol/h | — |
| Cocatalyst feed | 15 mmol/h | 30 mmol/h |
| Dispersion medium<br>(diesel oil) | 25 l/h | 50 l/h |
| Ethylene | 9.5 kg/h | 10 kg/h |

TABLE 1-continued

|  | Reactor I<br>Capacity: 120 l | Reactor II<br>Capacity: 120 l |
|---|---|---|
| 1-Hexene | 0 ml/h | 913 ml/h |
| Hydrogen in the gas phase | 80% by vol. | 0.7% by vol. |
| Total pressure | 8.9 bar | 2.0 bar |

The polyethylene molding material produced in this way had a melt flow index $MFI_{5/190°\,C.}$ of 0.18 dg/min, measured in accordance with ISO 11 33, and a density d of 0.950 g/cm³. For even better characterization, the polyethylene was subjected to a preparative TREF analysis (Temperature Rising Elution Fractionation) This analytical method is a very useful tool for determining the comonomer distribution in partially crystalline polyethylene and has been published by L. Wild and T. Ryle under the title: "Crystallization distribution in polymers: a new analytical technique" in Poly. Prep. Am Chem. Soc.,—Polym. Chem Div., 18, 182 (1977). In accordance with this analytical method, the polymer to be investigated is dissolved in p-xylene, deposited on an inorganic support material and fractionated little by little therefrom using p-xylene at continuously rising temperatures, with the less crystalline fractions dissolving at lower temperatures and the more highly crystalline fractions dissolving at higher temperatures. In this way, it is possible to separate a partially crystalline polymer into different amount fractions, depending on the thickness of the crystalline lamellae. The various fractions can then themselves be again investigated for their molecular weight distribution by the GPC method (Gel Permeation Chromatography).

The diagram attached as FIG. 1 shows the result of a combined TREF/GPC analysis with the polyethylene molding material according to the invention.

The polyethylene produced as described above in accordance with Example 1 was firstly dissolved in p-xylene (boiling point: 138° C.) as indicated above and then deposited on a Chromosorb P support material by cooling. Fractions were then formed by elution at temperatures of 60, 70, 78, 83, 86, 89, 93, 100 and 110° C. A GPC analysis was then carried out with the fraction at 78° C.±3 K and the polymer fraction dissolved therein. Peak 1 shows the low-molecular-weight, highly crystalline PE fraction which is soluble at 78° C., with a low thickness of the crystalline lamellae, while peak 2 is caused by a fraction of greater molecular weight, but at the same time a high proportion of comonomer incorporation and thus again lower crystallinity. This product fraction coming under peak 2 is responsible for the high number of so-called "tie molecules" between the crystalline lamellae and thus for the extremely high stress cracking resistance of the pipe produced from the molding material according to the invention.

The polyethylene produced as described above in accordance with Example 1 was plasticated in an extruder having a diameter of 48 mm and a length corresponding to 24.4 times the diameter (117.12 cm) at a temperature of 227° C. and subsequently extruded through an annular die having an external diameter of 32.1 mm and a mandrel having a diameter of 26.5 mm to give a pipe having a diameter of 32.1 mm and a wall thickness of 3.08 mm with the aid of vacuum calibration. The cooling was carried out in a cooling bath having a length of 3 m which was held at a temperature of 15° C. The properties measured on the finished pipe are shown in Table 2 below.

COMPARATIVE EXAMPLE

A pipe was produced from polyethylene in accordance with the details in Example 1 of EP-A-739 937. The properties measured on the pipe are likewise shown in Table 2 below.

The abbreviations for the physical properties in Table 2 have the following meanings:

FCM=flexural creep modulus, measured in accordance with ISO 54852-Z4 in N/mm² as the one-minute value, FT=fracture toughness measured by the internal measurement method described above at 0° C. in mJ/mm², $NIS_{ISO}$=notched impact strength, measured in accordance with ISO 179/DIN 53453 in mJ/mm² at −20° C. and at +23° C., SCR=stress cracking resistance measured by the internal measurement method of M. Fleißner in h, PAB=processability, measured as extruder throughput in an extruder having a diameter D of 48 mm and a length L of 24.4·D at a constant screw speed of 80 revolutions per minute in kg/h, $p_c$=resistance to rapid crack growth, measured by the S4 test in bar on pipes in pressure class PN 10 having a diameter of 110 mm.

TABLE 2

|  | Example 1 | Comparison |
|---|---|---|
| FCM | 1400 | 1304 |
| FT | 10.0 | 8.8 |
| $NIS_{ISO}$ (+23/−20° C.) | 40/26 | 39.2/24.1 |
| SCR | >>1500 | >>1500 |
| PAB | 28 | 28.2 |
| $p_c$ | >25 | >25 |
| LTHS extrapol.<br>23° C. LCL 50 a | 12.5 | 11.1 |

The measurement values clearly show that the pipe according to the invention had much better strength properties and could also be processed better during production.

What is claimed is:

1. Polyethylene molding material having a bimodal molecular weight distribution which has an overall density of >0.948 g/cm³ and an $MFI_{5/190°}$ of <0.2 dg/min, characterized in that it comprises an amount of from 35 to 65% by weight of low-molecular-weight ethylene homopolymer A which has a viscosity $VN_A$ in the range from 40 to 90 cm³/g, a melt flow index $MFI_{190/2.16\,A}$ in the range from 40 to 2000 dg/min and a density $d_A$ of $\geq 0.965$ g/cm³, and an amount of from 35 to 65% by weight of high-molecular-weight ethylene copolymer B which has a viscosity number $VN_B$ in the range from 500 to 2000 cm³/g, a melt flow index $MFI_{190/5\,B}$ in the range from 0.02 to 0.2 dg/min and a density $d_B$ in the range from 0.922 to 0.944 g/cm³, and in that the fraction obtained during a preparative TREF analysis at a temperature of 78° C.±3 K using p-xylene has an average molecular weight of $\geq 200,000$ g/mol.

2. Pipe produced from a polyethylene molding material according to claim 1, characterized in that it has a stress cracking resistance of $\geq 1500$ h and a fracture toughness FT of $\geq 9$ mJ/mm².

3. Pipe according to claim 2, characterized in that it has a flexural creep modulus, measured in accordance with DIN 54852-Z4, of $\geq 1350$ N/mm².

4. Pipe according to claim 2, characterized in that has been produced from an ethylene polymer having a bimodal molecular weight distribution which comprises comonomers having from 4 to 10 carbon atoms in an amount of from 2.5 to 4% by weight in the relatively high-molecular-weight fraction B.

5. Pipe according to claim 3, characterized in that the low-molecular-weight fraction of the ethylene polymer has a melt flow index $MFI_{2.16/190°\,C.}$ in the range from 200 to 800 g/10 min.

6. Pipe according to claim 3, characterized in that the ethylene polymer has a melt flow index $MFI_{2.16/190°\ C.}$ of $\leq 0.19$ dg/min.

7. Pipe according to claim 2, characterized in that it has a notched impact strength $NIS_{ISO}$, measured in accordance with ISO 179 (DIN 53453), of at least 25 mJ/mm$^2$ at $-20°$ C. and of at least 40 mJ/mm$^2$ at $+23°$ C.

8. Pipe according to claim 2, characterized in that it has a resistance to rapid crack growth, measured in accordance with ISO/DIS 13477 on a pipe in pressure class PN 10 having a diameter of 110 mm (S4 test), of $\geq 20$ bar.

* * * * *